No. 686,566. Patented Nov. 12, 1901.
J. A. WIGHT.
FAUCET.
(Application filed Feb. 6, 1901.)
(No Model.)

Witnesses
Marcus L. Byng.
Geo. S. May, Jr.

Inventor
John A. Wight
By J. S. Barker
Attorney

UNITED STATES PATENT OFFICE.

JOHN A. WIGHT, OF CHICAGO, ILLINOIS.

FAUCET.

SPECIFICATION forming part of Letters Patent No. 686,566, dated November 12, 1901.

Application filed February 6, 1901. Serial No. 46,207. (No model.)

*To all whom it may concern:*

Be it known that I, JOHN A. WIGHT, a citizen of the United States, residing at Chicago, in the county of Cook and State of Illinois, have invented new and useful Improvements in Faucets, of which the following is a specification.

My invention relates to water-taps and faucets, and has for its object to produce a self-closing self-venting faucet of improved construction.

In the construction of a satisfactory faucet of the type referred to there are several requirements to be complied with. In the first place the parts should be as few and as simple as possible and should be so arranged as to be easily accessible for purposes of cleaning, &c.; secondly, the use of springs and like mechanism easily affected by the action of the water to control the operation of the valve should be avoided and the positive operation of the latter made to depend upon the water-pressure alone; thirdly, a perfect seating of the valve should be provided for, with means for compensating for any wear of the parts, to prevent leakage; fourthly, provision should also be made for overcoming the tendency of the valve to "hammer," and, finally, the faucet should be made self-venting in order that the pipes may be emptied when the water is turned off to prevent freezing or for other purposes. These and other advantages are all secured by me by the construction hereinafter described.

Figure 1:
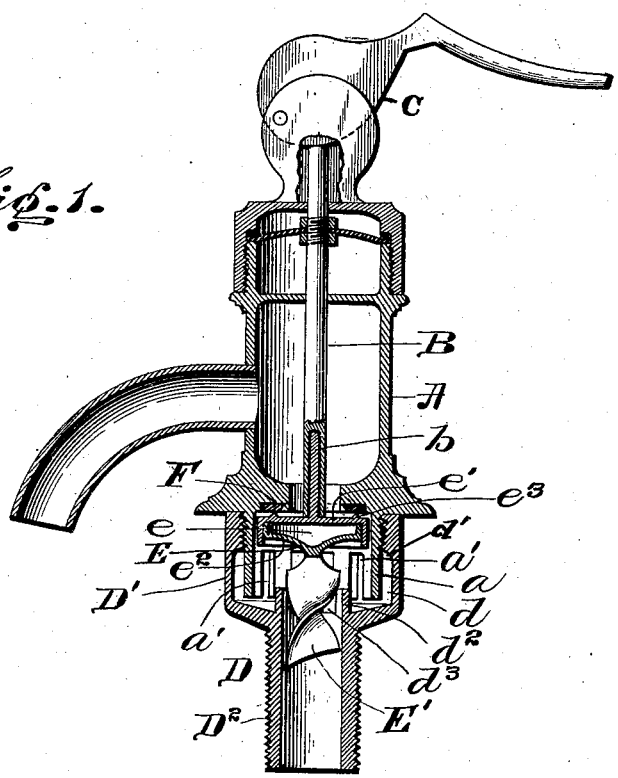
Figure 2:
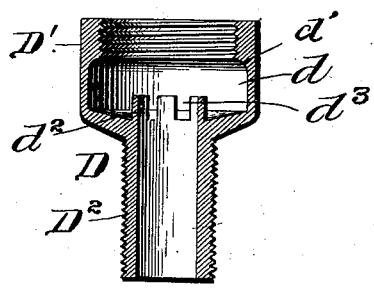

In the drawings, Figure 1 is a sectional elevation of a tap or faucet embodying my invention. Fig. 2 is a detail showing the construction of the base or induction piece of the casing.

A represents a valve-casing, B the valve-stem, and C the operating lever or handle therefor. The lever C is preferably eccentrically mounted, so as to act as a cam upon the upper extremity of the valve-stem to depress the same when the handle is moved. The stem B is preferably united near its upper end with the upper portion of the casing A by a flexible diaphragm, as shown, so forming a seal to prevent the leakage of water through the stem-opening in the top of the casing; but these parts may be modified or varied as may be desirable.

The valve-casing A is provided at its lower end with a depending annular flange $a$, screw-threaded on its upper portion for attachment to the base or induction piece D. The lower portion of said annular flange $a$ is left plain and is provided with a series of ports or apertures $a'$ for purposes to be hereinafter described.

The base or induction piece D consists of an upper enlarged portion D' and a threaded stem $D^2$, adapted to be connected with the supply-pipe. The enlarged or chambered portion of the induction-piece is internally screw-threaded near its upper end to engage the corresponding threads on the flange $a$ of the casing, and in the lower portion of such piece is formed an annular recess or channel $d$. The recess $d$ is of such width that the shoulder $d'$ at the top thereof is in the same horizontal plane as the top of the ports or orifices $a'$ in the flange $a$. The piece D is also provided with an annular flange $d^2$, surrounding the mouth of the inlet-opening in said piece, said flange being provided with slots or orifices $d^3$, as best shown in Fig. 2.

The valve E comprises a circular body $e$ of such size as to slide freely within the flange $a$ of the casing and connected with the stem B by a pin or spindle $b$, fitting in a socket or recess in the stem and forming a loose joint therewith. The body of the valve is preferably hollow, as shown, and is preferably composed of two cup-shaped members $e'$ and $e^2$, united by soldering or other suitable means, so as to form a closed air-tight chamber, as shown in Fig. 1.

From the center of the lower member $e^2$ of the valve E projects a short stem or lug carrying a spiral or helical plate E', formed integral therewith or attached thereto, extending downward into the mouth of the pipe $D^2$ and preferably of a width substantially corresponding with the diameter of the pipe. On its upper or bearing surface the valve member is provided with a circular rib or projection $e^3$ of inverted-V shape in cross-section, so as to offer a sharp edge to the opposing seat. The seat may be composed of any suitable material—as rubber, Babbitt metal, or the like—and consists of a ring F, of such material, seated in an outwardly-contracted or dovetail-shaped groove in the under face of the casing-body.

The operation of the tap is as follows: The water system being in its normal condition, with the pipes full, the valve is held by reason of its buoyancy and the pressure of the water below in the closed position shown in Fig. 1. If now the handle or lever be depressed, the valve is thereby pushed down until its under surface comes in contact with the top of the flange $d^2$. The water flowing in through the orifices $d^3$ in said flange rushes beneath the valve-plate through the openings $a'$ in the flange $a$ and up through the channel $d$, where, encountering the shoulder $d'$ at the top of said channel, it is deflected downward and inward again and is forced in through the openings or orifices $a'$ upon the top of the valve, whence it flows up through the casing and the spigot. It will thus be seen that the inflowing water exerts a downward force upon the valve as well as an upward force, which serves to steady the same and prevent hammering. At the same time the flowing water acts upon the helix $E'$, rotating the same and with it the valve, so that the periphery of the valve-body $e$ serves as a cleaner to prevent the deposit of sediment in the openings $a'$, while the spiral plate itself keeps clear the ingress-pipe and the flange $d^2$. Thus the valve is made practically self-cleaning. Another function which the spiral plays is to insure a firm and tight seating of the valve. Thus when the handle is released the water, exerting its greatest force on the under side of the valve, moves the same upward to seat it, and the spiral, rotated by the pressure, grinds the sharp edge of the ring $e^3$ firmly into the seat F. If also at any time wear should cause an unevenness of seating, which allows the water to leak past, the movement of the valve incident thereto will twist the valve around until it comes to such position that the leak is stopped or until it wears a deeper and firmer seating-groove. It will thus be seen that the positive closing of the valve is accomplished without the use of springs, diaphragms, or the like, the entire closing action depending on the upward pressure of the water, aided by the buoyancy of the air-filled valve-body. It is apparent, however, that a solid valve-plate might be employed with success where the water-pressure is great; but the hollow valve structure herein described is particularly advantageous where a light water-pressure exits, and a very rapid closing action is insured thereby.

Another important result accomplished by my construction is the venting of the pipes when it is desired to draw the water off to prevent freezing or for other purposes. Thus if the supply be cut off from the main and the stop-cock on the lowest level available be opened the pressure is removed from each faucet located above such level, and the valve, actuated by gravity, falls to open position. This permits the ingress of the air into the pipes through the faucet, the air following the opposite course from that taken by the water when the faucet is in operation and passing through the casing, the channel $d$, and the openings $d^3$ into the pipe.

Another advantage incident to my invention is the ease with which access may be had to the parts to repair or clean them. As will be seen, the simple unscrewing of the casing A from the base-piece D exposes all of the working parts, and the valve, being perfectly loose in its chamber, may then be lifted out, giving free access to the induction-pipe and the channel $d$. The practical advantage of such simplicity of construction and the absence of any parts liable to wear quickly or be affected by the action of the water is apparent.

I do not wish to limit my invention to the exact construction shown, as slight changes and modifications to adapt the structure shown to the needs of faucets of other types than that herein shown by way of illustration may be made by those skilled in the art without departing from the spirit of my invention.

Having described my invention, what I claim, and desire to secure by Letters Patent, is—

1. In a faucet, the combination with the casing having an inlet-opening, of a valve for closing said opening, and an induction-chamber surrounding the valve having a channel in its wall for directing the inflowing water inward upon the top of the valve when the latter is moved to open position, substantially as set forth.

2. The combination of a faucet-casing having a depending flange provided with ports $a'$, of an induction-piece provided with a channel formed with a shoulder at its top, said shoulder alining with the top of ports $a'$, and a reciprocating valve arranged, when in open position, to lie with its upper face below the level of said shoulder, substantially as set forth.

3. In a faucet, the combination with the casing, of an induction-chamber having an ingress-opening and a flange surrounding said opening, said flange being provided with ports, of a reciprocating valve arranged within said induction-chamber and arranged, when in open position to rest upon said flange, substantially as set forth.

4. In a faucet, the combination with the casing, and valve-seat, of a reciprocating valve comprising two cup-shaped members united to form a closed, air-tight chamber, a valve-stem, and an operating-handle therefor, substantially as set forth.

5. In a faucet, the combination with the casing and valve-seat, of a valve comprising two cup-shaped members united to form an air-chamber, a helix secured to one of said members, a valve-stem loosely connected to the other of said members, and an operating-handle connected with said stem, substantially as set forth.

JNO. A. WIGHT.

Witnesses:
JAMES JENSEN,
JOHN T. EDIS.